United States Patent [19]

Sakai et al.

[11] Patent Number: 4,548,044
[45] Date of Patent: Oct. 22, 1985

[54] METAL HYDRIDE CONTAINER AND METAL HYDRIDE HEAT STORAGE SYSTEM

[75] Inventors: Takashi Sakai; Naojiro Honda; Ikuo Yonezu, all of Hirakata, Japan

[73] Assignee: Agency of Industrial Science & Technology, Tokyo, Japan

[21] Appl. No.: 681,504

[22] Filed: Dec. 14, 1984

Related U.S. Application Data

[62] Division of Ser. No. 418,029, Sep. 14, 1982, Pat. No. 4,510,759.

[30] Foreign Application Priority Data

Sep. 17, 1981 [JP] Japan ............................... 56-145601
Sep. 17, 1981 [JP] Japan ............................... 56-145602

[51] Int. Cl.⁴ ................................................ F17C 11/00
[52] U.S. Cl. ............................................. 62/48; 34/15; 165/104.12; 423/248; 123/DIG. 12
[58] Field of Search ................... 62/48; 165/104.12; 34/15; 423/248; 123/1 A, DIG. 12

[56] References Cited

U.S. PATENT DOCUMENTS

| 4,033,130 | 7/1977 | Hermans | 165/104.11 A |
| 4,084,376 | 4/1978 | Asselman et al. | 165/104.11 A |
| 4,134,491 | 1/1979 | Turillon | 62/48 |
| 4,165,569 | 8/1979 | Mackay | 62/48 |
| 4,270,300 | 6/1981 | Nakane et al. | 62/48 |
| 4,409,799 | 10/1983 | Nishizaki et al. | 62/467 |
| 4,421,156 | 12/1983 | Vaubel | 165/104.11 A |
| 4,422,500 | 12/1983 | Nishizaki | 165/104.11 A |

FOREIGN PATENT DOCUMENTS

| 14210 | 2/1977 | Japan . |
| 126199 | 9/1980 | Japan . |
| 37486 | 3/1983 | Japan . |
| 164994 | 9/1983 | Japan . |
| 182087 | 10/1983 | Japan . |

Primary Examiner—Ronald C. Capossela
Attorney, Agent, or Firm—Stiefel, Gross, Kurland & Pavane

[57] ABSTRACT

A metal hydride container, comprising a heat pipe of annular cross section, a metal hydride filling the central cavity of said heat pipe, closure members serving to close the openings at the opposite ends of said central cavity, a hydrogen passage tube possessed of a shut-off valve and fitted into an aperture formed in one of said closure members and communicated with the cavity of the heat pipe through a partition member pervious to hydrogen gas and impervious to said metal hydride; and a metal hydride heat storage system comprising at least one metal hydride container above-mentioned, which is useful for storing solar heat and waste heat.

1 Claim, 5 Drawing Figures

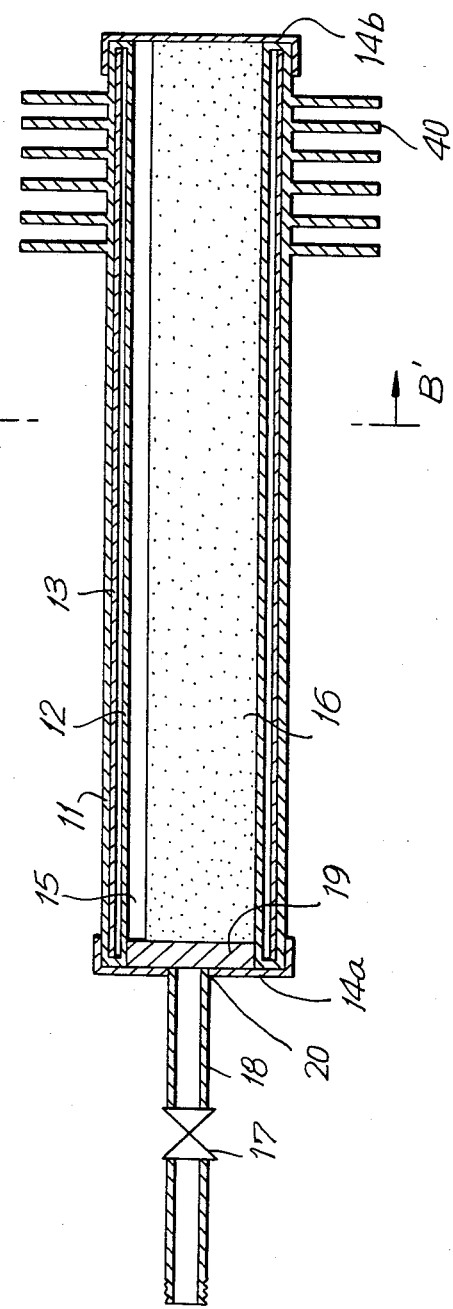
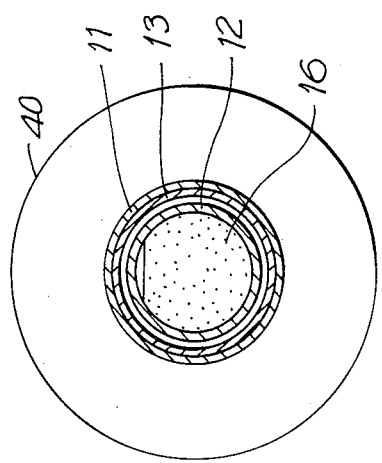
FIG. 3
FIG. 4

METAL HYDRIDE CONTAINER AND METAL HYDRIDE HEAT STORAGE SYSTEM

This is a division of application Ser. No. 418,029, filed Sept. 14, 1982 now U.S. Pat. No. 4,510,759.

BACKGROUND OF THE INVENTION

1. Field of the Invention

This invention relates to a metal hydride container comprising a heat pipe of annular cross section and a metal hydride filling the central cavity of the heat pipe, and to a heat storage system comprising an insulating body having at least one such metal hydride container inserted fast therein, a heat exchanger, a hydrogen gas distributor, and a hydrogen storage tank.

2. Description of the Prior Art

The technique of heat storage using a metal hydride is attracting attention as a novel method of heat storage which is capable of utilizing heat (such as solar heat or plant's waste heat) for a long time. This method features (1) capability of prolonged heat storage, (2) quick reaction of metal and hydrogen, (3) easy control of the reaction solely by regulation of gas flow, and (4) large amount of heat storage per unit volume, for example.

Yet, the method has problems: (1) As the cycle of absorption and desorption of hydrogen is repeated, the metal hydride gradually undergoes comminution and loss of volume. (2) Since the metal hydride itself has low thermal conductivity, it suffers from inferior heat transfer (transfer of heat of reaction). As a measure to overcome these problems, it is advantageous to adopt the multi-tube heat exchanger method which uses as many separate containers for the metal hydride as possible and which, therefore, furthers the capacity of the metal hydride for contact with the heat transfer tubes even when the metal hydride suffers from loss of volume (First World Hydrogen Energy Conference, Mar. 1–3, 1976, Miami Beach, Fla., U.S.A., Conference Proceedings Volume III, 7C-22). And as a measure to eliminate the difficulty of (2), the aforementioned multi-tube heat exchanger method proves advantageous and the incorporation of a thermally conductive powder (such as, for example, copper, silver, or aluminum) in the metal hydride is effective.

The heat storage system using a metal hydride has another disadvantage that the heat of reaction of the metal hydride is wasted in the form of sensible heat to the container. Either the aforementioned multi-tube heat exchanger method or the method which simply confines the metal hydride in a pressure vessel so as to recover the heat of reaction directly [by keeping a copper coil within the vessel thereby recovering the heat of reaction with a heat medium such as water circulated through the copper coil; Philips Research Reports, Supplement, No. 1 (1976), pages 71–73 ] or indirectly (by having a heat transfer pipe such as a heat pipe inserted in advance in the vessel thereby recovering the heat of reaction via a heat exchanger provided at the exposed end of the heat pipe; Japanese Laid-Open Patent Application No. 53390/1980) does not prove satisfactory for the purpose of reducing the loss of sensible heat.

This invention has been perfected for the purpose of solving the various problems described above and provides a novel metal hydride container possessed of excellent properties and a heat storage system using the metal hydride container.

SUMMARY OF THE INVENTION

This invention provides a metal hydride container which comprises a heat pipe of annular cross section, a metal hydride filling the cavity of the heat pipe, closure members serving to close the central openings at the opposite ends of the central cavity, a hydrogen passage tube possessed of a shut-off valve and fitted into an aperture formed in one of the closure members and communicated with the central cavity of the heat pipe through a partition member pervious to hydrogen and impervious to the metal hydride, and a metal hydride heat storage system which comprises an insulating body in the shape of a rectangular parallelepiped having formed in one of the lateral faces thereof vertically spaced horizontal recesses adapted to support as inserted therein at least one of the metal hydride container described above, heat insulating lids serving to close the openings into the horizontal recesses, a heat exchanger containing therein a heat medium held in contact with a heat exchanger unit of the metal hydride container, and a hydrogen gas distributor and a hydrogen storage tank both communicating with the hydrogen passage tube of the metal hydride container.

The metal hydride container of this invention is characterized by the fact that the heat pipe of annular cross section to be used for heat transfer concurrently serves as a vessel for the metal hydride. To be specific, the metal hydride container, which is formed by closing the opposite openings of the heat pipe of annular cross section with closure members, holds the metal hydride in the consequently closed central cavity of the heat pipe, with a hydrogen passage tube led out of the central cavity.

Consequently, the metal hydride container enjoys the advantages that the aforementioned waste of sensible heat is reduced, that the effective heat exchange is obtained because the area of contact between the heat pipe and the metal hydride is large, and that even when the metal hydride is gradually comminuted as the cycle of absorption and desorption of hydrogen is repeated, the degree of the loss of area of contact is very small. The heat storage system of this invention comprises an insulating body in the shape of a rectangular parallelepiped having formed in one of the lateral faces thereof vertically spaced horizontal recesses adapted to support as inserted therein at least one of the aforementioned metal hydride container, insulating lids serving to close the horizontal recesses, a heat exchanger provided on the shell of the insulating body and containing therein a heat medium as held in contact with the heat exchange unit of the metal hydride container, and a hydrogen gas distributor and a hydrogen storage tank both communicating with the hydrogen passage of the metal hydride container. Particularly when a plurality of metal hydride containers are disposed in parallel connection in this heat storage system, the heat storage system can be operated at any of graduated capacities to meet particular demand of heat. If one of the plurality of metal hydride containers becomes exhausted, the heat storage system can still be operated with the remaining metal hydride containers.

BRIEF DESCRIPTION OF THE DRAWING

FIG. 3 and FIG. 4 are similarly a longitudinal section and a cross section respectively of another typical metal hydride container to be used for the same purpose as above.

DESCRIPTION OF THE PREFERRED EMBODIMENT

Figure 1:
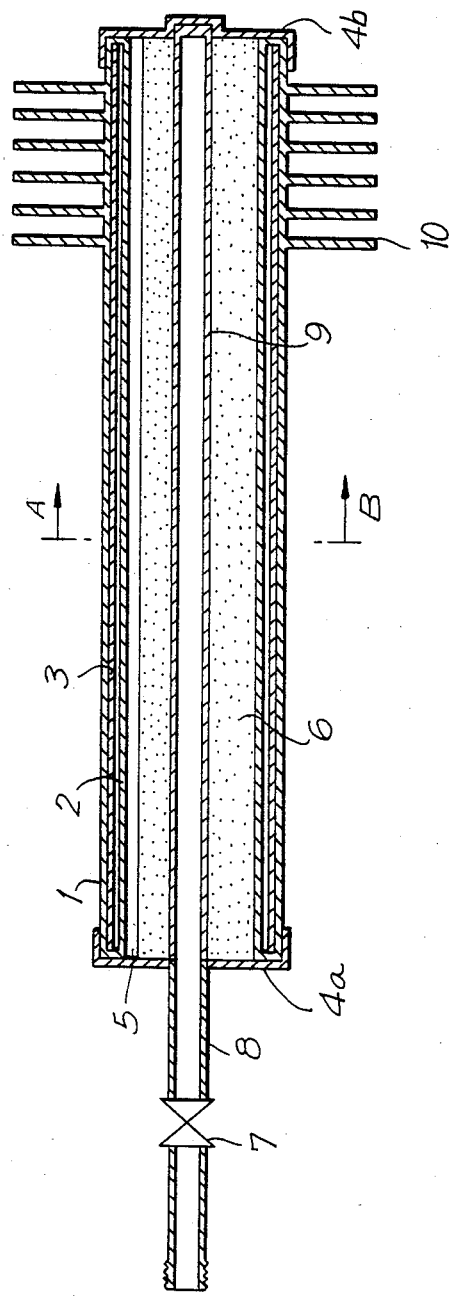
FIG. 1 and FIG. 2 are a longitudinal section and a cross section respectively of one typical metal hydride container to be used in the metal hydride heat storage system of the present invention.
Figure 2:
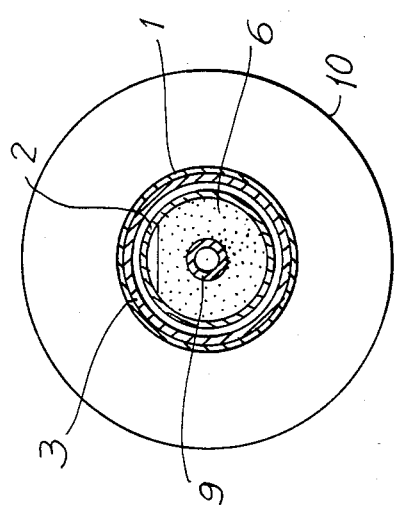

The metal hydride container of this invention will be described below with reference to the accompanying drawings. FIG. 1 and FIG. 2 are a longitudinal section and a cross section taken along the line A–B respectively of a typical metal hydride container to be used in the metal hydride heat storage system of the present invention. In the diagram, 1 and 2 denote an outer and an inner tube of a heat pipe of annular cross section and 3 denotes a wick. The opposite openings of the heat pipe of annular cross section are closed with closure plates 4a, 4b. To the closure plate 4a is fitted a hydrogen passage tube 8 which is provided with a shut-off valve 7. From the position at which the hydrogen passage tube 8 is fitted to the closure plate 4a, a porous conduit 9 made of sintered alloy, for example, and therefore pervious to hydrogen and impervious to the metal hydride is axially extended in the central cavity 5 of the heat pipe. The central cavity 5 is filled with the metal hydride 6. The outer tube 1 of the heat pipe is provided in one end portion of the outer side thereof with a plurality of fins 10. In this metal hydride container, the porous conduit 9 prevents the metal hydride from being scattered outwardly and, at the same time, permits ready passage of hydrogen gas. This conduit 9 need not be extended all the way to the closure plate 4b as illustrated but may be projected to a point falling halfway along the length of the central cavity. It need not be in a tubular shape but may be in some other shape.

The metal hydride to be contained in the container includes the hydrides of such metal alloys as $CaNi_5$, $Ca_{0.8}Mm_{0.2}Ni_5$ and the like which have higher heat of reaction with hydrogen and can be hydrogenated at the vicinity of 80–100°C.

FIG. 3 and FIG. 4 are a longitudinal section and a cross section taken along the line A'–B' respectively of another typical metal hydride container. In the diagram, 11 and 12 denote an outer and an inner tube of a heat pipe of annular cross section and 13 denotes a wick. The outer tube 11 is provided in one end portion of the outer side thereof with a plurarity of fins 40. The opposite openings of the heat pipe of annular cross section are closed with closure plates 14a, 14b. To the closure plate 14a is fitted a hydrogen passage conduit 18 which is provided with shut-off valve 17. A porous plate 19 made of sintered alloy, for example, and therefore pervious to hydrogen and impervious to the metal hydride is disposed fast on the inner wall of the closure plate 14a. The central cavity 15 is filled with the metal hydride 16. Although the porous plate 19 is illustrated as exposed to the contents of the heat pipe, it may be a circular plate of small diameter barely enough to close an opening 20 of the hydrogen passage tube. A device which, instead of the porous plate 19 mentioned above, has a porous plate member pervious to hydrogen and impervious to the metal hydride disposed within the hydrogen passage tube between the shut-off valve 17 and the opening 20 is also embraced in the scope of this invention. In this metal hydride container, too, the porous plate prevents the metal hydride from being scattered outwardly.

Figure 5:
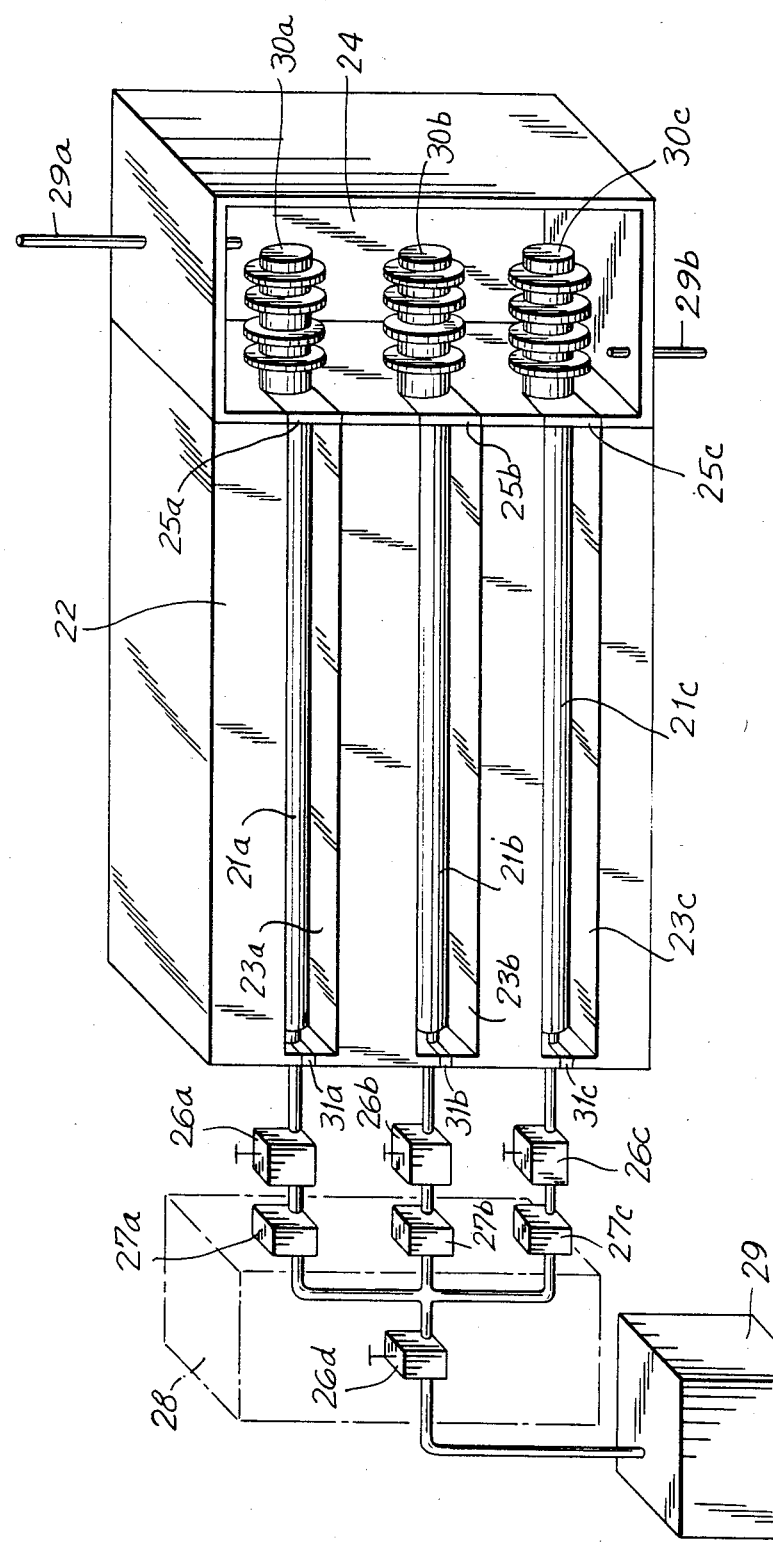
FIG. 5 is a perspective view of a typical metal hydride heat storage system of this invention, with a part sectioned to illustrate the inner construction.

Now, the metal hydride heat storage system of the present invention will be described with reference to the accompanying drawing. FIG. 5 is a partially sectioned perspective view of a typical metal hydride heat storage system using three metal hydride containers of the construction of FIG. 1 and FIG. 2, with the partial section illustrating the inner structure of the heat storage system.

The metal hydride containers 21a, 21b, 21c are inserted one each into vertically spaced horizontal recesses 23a, 23b, 23c which are formed in one lateral side of an insulating body 22. The spaces separating the recesses from the metal hydride containers are filled with an insulation (such as glass wool) and the openings into the recesses are covered with heat insulating lids of the insulating body. The insulating body 22 is provided along one side thereof with a heat exchanger 24 which is filled with a heat medium. The lateral side of the heat exchanger 24 bordering on the insulating body 22 is provided with notches cut at the positions corresponding to the positions of the recesses. In the recesses, the metal hydride containers are disposed so that their respective heat exchange units 30a, 30b, 30c will protrude into the heat exchanger 24. The notches are sealed with sealing members 25a, 25b, 25c. Of course, the heat exchanger 24 is fitted with a lateral lid (not shown) through the medium of a sealing material. The metal hydride containers 21a, 21b, 21c are joined through connecting members 27a, 27b, 27c to the hydrogen distributor 28, which is connected via a conduit to the hydrogen storage tank 29. The notches for the hydrogen passage tubes of the metal hydride containers are sealed with sealing members 31a, 31b and 31c.

Now, the method for the operation of this heat storage system will be described.

The heat medium which has accumulated solar heat, for example, is led through the heat medium inlet 29b to the heat exchanger 24. As this heat elevates the temperature of the heat exchange units 30a, 30b, 30c of the metal hydride containers protruding into the interior of the heat exchanger 24, the metal hydride held within the metal hydride containers 21a, 21b 21c is heated to release hydrogen. The shut-off valves 26a, 26b, 26c 26d are opened to discharge the released hydrogen gas into the hydrogen storage tank 29. When the accumulated heat is desired to be used, the shut-off valves 26a, 26b, 26c, 26d are opened to forward the hydrogen gas into the metal hydride containers 21a, 21b, 21c. The metal hydride which has been converted into a metal or alloy by the aforementioned release of hydrogen during the heat exchange reacts with the delivered hydrogen gas with liberation of heat. This heat is transferred through the projecting ends 30a, 30b, 30c of the metal hydride containers to the heat medium. Then, the heated medium is used for space cooling or heating or for hot water supply, for example.

The hydrogen storage tank may contain the hydrides of such metal alloys as $LaNi_5$ and the like which can be hydrogenated or dehydrogenated at the vicinity of ordinary temperature.

This heat storage system offers the following advantages. The waste of sensible heat is small because of the use of the heat pipe having the aforementioned construction. The capacity of the heat storage system itself can be easily adjusted by increasing or decreasing the number of metal hydride containers to be installed.

Since a plurality of metal hydride containers are used, one heat storage system can be operated at any of as many graduated capacities as the containers. Further, the individual metal hydride containers can be replaced independently of each other with new supplies.

What is claimed is:

1. A metal hydride heat storage system, comprising:
a plurality of metal hydride containers, each comprising a heat pipe of annular cross-section, a metal hydride in a central cavity of said heat pipe, closure members closing opposite ends of the central cavity, a heat exchange unit, and a hydrogen passage tube fitted into an aperture defined in one of said closure members and communicating with the central cavity of said heat pipe through a partition member pervious to hydrogen gas and impervious to said metal hydride;
an insulating body adapted to support said metal hydride container;
a heat exchanger containing a heat medium in contact with said heat exchange units of said metal hydride containers;
a hydrogen gas distributor; and
a hydrogen storage tank;
said hydrogen passage tubes of said metal hydride containers being disposed in communication with said hydrogen gas distributor and hydrogen storage tank and having at least a shut-off valve therein.

* * * * *